US010809735B2

(12) United States Patent
Halder

(10) Patent No.: US 10,809,735 B2
(45) Date of Patent: Oct. 20, 2020

(54) SYSTEM AND METHOD FOR A FRAMEWORK OF ROBUST AND SAFE REINFORCEMENT LEARNING APPLICATION IN REAL WORLD AUTONOMOUS VEHICLE APPLICATION

(71) Applicant: SafeAI, Inc., Milpitas, CA (US)

(72) Inventor: Bibhrajit Halder, Sunnyvale, CA (US)

(73) Assignee: SafeAI, Inc., Milpitas, CA (US)

( * ) Notice: Subject to any disclaimer, the term of this patent is extended or adjusted under 35 U.S.C. 154(b) by 51 days.

(21) Appl. No.: 16/124,176

(22) Filed: Sep. 6, 2018

(65) Prior Publication Data
US 2019/0310649 A1 Oct. 10, 2019

Related U.S. Application Data

(60) Provisional application No. 62/654,526, filed on Apr. 9, 2018.

(51) Int. Cl.
*G05D 1/02* (2020.01)
*G06N 20/00* (2019.01)
*G05D 1/00* (2006.01)

(52) U.S. Cl.
CPC ......... *G05D 1/0221* (2013.01); *G05D 1/0088* (2013.01); *G05D 1/0214* (2013.01); *G06N 20/00* (2019.01); *G05D 2201/0213* (2013.01)

(58) Field of Classification Search
CPC .. G05D 1/0221; G05D 1/0088; G05D 1/0214; G06N 20/00
See application file for complete search history.

(56) References Cited

U.S. PATENT DOCUMENTS 9,187,088 B1 11/2015 Ferguson et al.
2008/0236275 A1 10/2008 Breed et al.
(Continued)

FOREIGN PATENT DOCUMENTS

DE 202016004628 U1 9/2016
WO 2008005659 A2 1/2008
WO 2017091629 A1 6/2017

OTHER PUBLICATIONS

Kardell et al., "Autonomous Vehicle Control via Deep Reinforcement Learning", Department of Electrical Engineering, Chalmers University of Technology, Available online at: https://pdfs.semanticscholar.org/0044/0fbe53b0b099a7fa1a4714caf401c8663019.pdf, Oct. 2017, pp. 1-73.
Gal, "Uncertainty in Deep Learning", Department of Engineering of University of Cambridge, PhD Thesis, Sep. 2016, 174 pages.
(Continued)

*Primary Examiner* — Charlie Y Peng
(74) *Attorney, Agent, or Firm* — Kilpatrick Townsend & Stockton LLP

(57) ABSTRACT

In one aspect, a computer-implemented method useful for managing autonomous vehicle application operations with reinforcement learning (RL) methods, the method includes the step of providing an autonomous vehicle application of an autonomous vehicle, wherein the autonomous vehicle application manages a final action of a specified operation of the autonomous vehicle. The method includes the step of generating an RL model-agent for the specified operation. The RL model-agent learns by a maximizing rewards function related to the specified operation. The method includes the step of generating and managing a Safety Sanity Index (SSI) that monitors the safety performance of RL model. The method includes the step of obtaining an observed state of the autonomous vehicle, and generating an interruptible command based on the SSI and the observed state.

20 Claims, 10 Drawing Sheets

(56) References Cited

U.S. PATENT DOCUMENTS

| | | |
|---|---|---|
| 2009/0234499 A1 | 9/2009 | Nielsen et al. |
| 2010/0106356 A1 | 4/2010 | Trepagnier et al. |
| 2012/0089291 A1 | 4/2012 | Halder et al. |
| 2012/0281907 A1 | 11/2012 | Samples et al. |
| 2015/0339570 A1 | 11/2015 | Scheffler |
| 2016/0096270 A1 | 4/2016 | Ibarz Gabardos et al. |
| 2016/0221500 A1 | 8/2016 | Sakai et al. |
| 2017/0151910 A1 | 6/2017 | Sato |
| 2017/0297576 A1 | 10/2017 | Halder et al. |
| 2017/0357270 A1 | 12/2017 | Russell |
| 2018/0074493 A1 | 3/2018 | Prokhorov et al. |
| 2018/0089563 A1 | 3/2018 | Redding et al. |
| 2018/0093676 A1 | 4/2018 | Emura et al. |
| 2019/0025857 A1* | 1/2019 | Luckevich ............... G08G 1/22 |
| 2019/0113927 A1* | 4/2019 | England ............... G05D 1/0212 |
| 2019/0291727 A1* | 9/2019 | Shalev-Shwartz ........................... G05D 1/0088 |
| 2019/0310627 A1 | 10/2019 | Halder |
| 2019/0310636 A1 | 10/2019 | Halder |
| 2019/0310650 A1 | 10/2019 | Halder |
| 2019/0310654 A1 | 10/2019 | Halder |

OTHER PUBLICATIONS

Mahalanobis, "On the Generalized Distance in Statistics", Published by the National Institute of Sciences of India and Printed by P. Knight, Baptist Mission Press, 1936, pp. 49-55.
Garcia, "Cosine Similarity Tutorial", ResearchGate, published Apr. 10, 2015, Updated Aug. 26, 2018, 8 pages.
Martos, et al., "On the Generalization of the Mahalanobis Distance", Lecture Notes in Computer Science, CIA RP 2013, Part 1 LNCS 8258, pp. 125-132.
Leon et al., A Generalized MahalanobisDistance for Mixed Data, Journal of Multivariate Analysis 92, 2005, pp. 174-185.
LeCun et al., "Gradient-Based Learning Applied to Document Recognition", Proc. IEEE 86, Nov. 1998, pp. 1-46.
International Application No. PCT/US2019/026641, International Search Report and Written Opinion dated Jul. 11, 2019, 8 pages.
International Application No. PCT/US2019/026645, International Search Report and Written Opinion dated Jul. 3, 2019, 9 pages.
International Application No. PCT/US2019/026648, International Search Report and Written Opinion dated Jul. 3, 2019, 12 pages.
International Application No. PCT/US2019/026651, International Search Report and Written Opinion dated Jul. 5, 2019, 12 pages.
International Application No. PCT/US2019/026653, International Search Report and Written Opinion dated Jul. 2, 2019, 12 pages.

* cited by examiner

SYSTEM AND METHOD FOR A FRAMEWORK OF ROBUST AND SAFE REINFORCEMENT LEARNING APPLICATION IN REAL WORLD AUTONOMOUS VEHICLE APPLICATION

INCORPORATION BY REFERENCE

This application claims the benefit of priority from U.S. Provisional Application Ser. No. 62/654,526, titled SYSTEM AND METHOD FOR SAFELY NAVIGATING, CONTROLLING, PERFORMING TASK, AND PROVING INPUT TO USER FOR AUTONOMOUS VEHICLES AND EQUIPMENT, and which was filed on 9 Apr. 2018, which is expressly incorporated by reference herein in its entirety.

FIELD OF THE INVENTION

The invention is in the field of autonomous vehicles and more specifically to a method, system and apparatus of a framework of robust and safe reinforcement learning application in real world autonomous vehicle application.

DESCRIPTION OF THE RELATED ART

With the increasing use of Artificial Intelligence (AI) system in autonomous driving, AI has moved from labs to production. Autonomous driving application uses AI systems to interact with the real world by identifying objects and making automatic decision which have safety critical consequences. Current, AI systems are not well equipped for ensuring functional safety. Accordingly, improvement to AI systems are provided to take AI to production and ensure safety.

SUMMARY OF THE INVENTION

In one aspect, a computer-implemented method useful for managing autonomous vehicle application operations with reinforcement learning (RL) methods, the method includes the step of providing an autonomous vehicle application of an autonomous vehicle, wherein the autonomous vehicle application manages a final action of a specified operation of the autonomous vehicle. The method includes the step of generating an RL model-agent for the specified operation. The RL model-agent learns by a maximizing rewards function related to the specified operation. The method includes the step of generating and managing a Safety Sanity Index (SSI) that monitors the safety performance of RL model. The method includes the step of obtaining an observed state of the autonomous vehicle, and generating an interruptible command based on the SSI and the observed state. The method includes the step of providing the observed state of the autonomous vehicle as a feedback to RL model-agent that decides a next action for the autonomous. The method includes the step of providing the observed state to an Epistemic Uncertainty Check (EUC) module to determine that the input-state distribution varies from a training-state distribution based on a specified distance value between the input-state distribution varies from a training-state distribution. The EUC module then outputs an RL Model Confidence Factor (RLMCF). The method includes the step of communicating the RLMCF from the RL model-agent and the interruptible command from the vehicle safety manager (VSM) to an Action Integrity Module (AIM) to determine the final action for the autonomous vehicle.

BRIEF DESCRIPTION OF THE DRAWINGS

The present application can be best understood by reference to the following description taken in conjunction with the accompanying figures, in which like parts may be referred to by like numerals.

Figure 1:
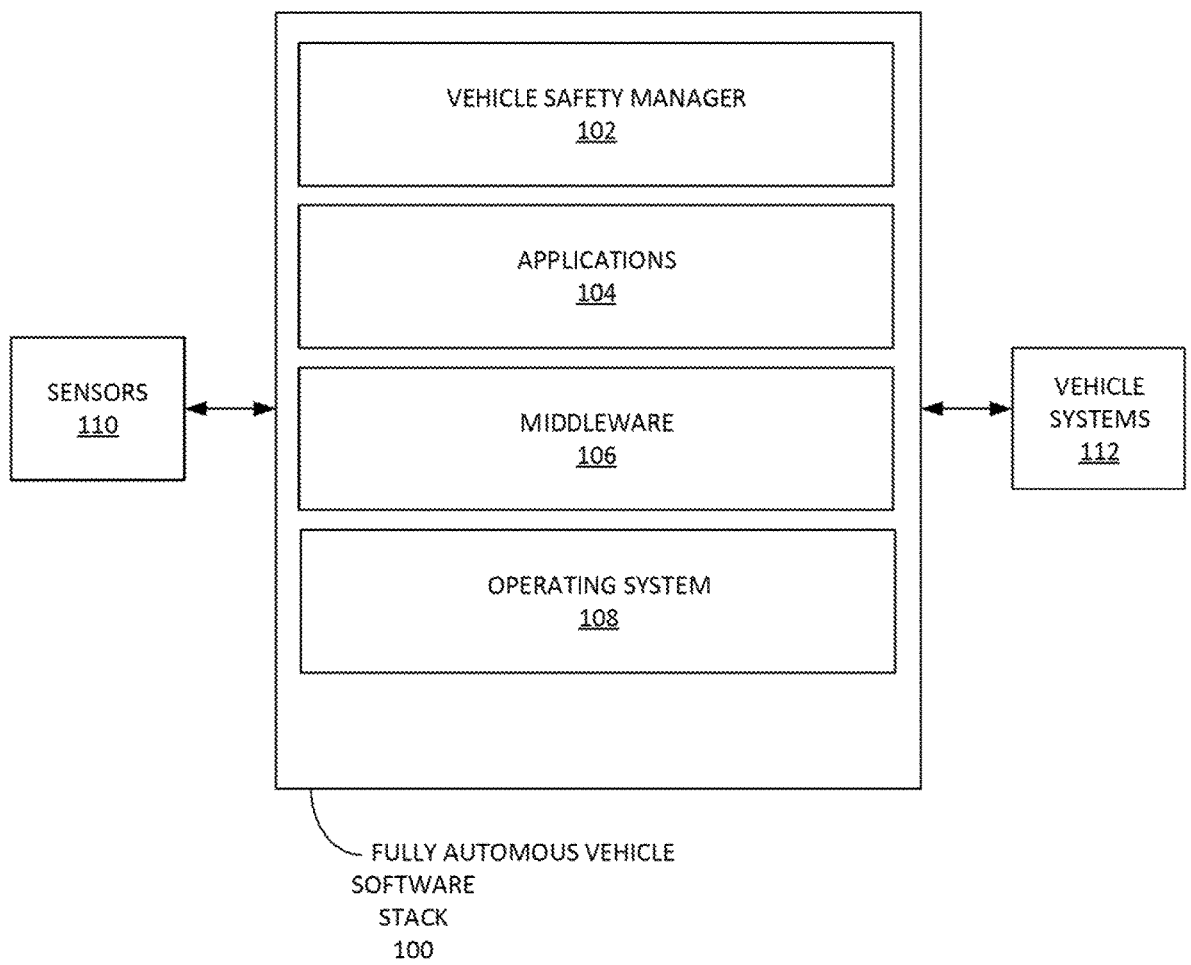
FIG. 1 depicts an example autonomous vehicle management system, according to some embodiments.

The Figures described above are a representative set and are not an exhaustive with respect to embodying the invention.

DESCRIPTION

Disclosed are a system, method, and article of manufacture of robust and safe reinforcement learning application in real world autonomous vehicle application. Although the present embodiments have been described with reference to specific example embodiments, it will be evident that various modifications and changes may be made to these embodiments without departing from the broader spirit and scope of the particular example embodiment.

References throughout this specification to "one embodiment," "an embodiment," or similar language mean that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize however, that the invention may be practiced without one or more of the specific details, or with other methods, components, materials, and so forth. In other instances, well-known structures, materials or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or one steps, or portions thereof, of the illustrated method. Additionally, the for at and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance an arrow may indicate a waiting or monitoring period of unspecified duration between enumerated steps of the depicted method. Additionally, the order in which a particular method occurs may or may not strictly adhere to the order of the corresponding steps shown.

Exemplary Definitions

Autonomous vehicle can be a vehicle that is capable of sensing its environment and navigating with or without human input.

Dead reckoning is the process of calculating one's current position by using a previously determined position, or fix, and advancing that position based upon known or estimated speeds over elapsed time and course.

Inertial measurement unit (IMU) is an electronic device that measures and reports a body's specific force, angular rate, and sometimes the magnetic field surrounding the body, using a combination of accelerometers, gyroscopes, magnetometers, etc.

Labeled data is a group of samples that have been tagged with one or more labels. Labeling can also be used to take a set of unlabeled data and augments each piece of that unlabeled data with meaningful tags that are informative.

Lidar (LIDAR) is a surveying method that measures distance to a target by illuminating the target with pulsed laser light and measuring the reflected pulses with a sensor.

Mahalanobis distance is a measure of the distance between a point P and a distribution D. It is a multi-dimensional generalization of the idea of measuring how many standard deviations away P is from the mean of D. This distance is zero if P is at the mean of D, and grows as P moves away from the mean, the Mahalanobis distance measures the number of standard deviations from P to the mean of D. The Mahalanobis distance is an unitless and scale-invariant, and takes into account the correlations of the data set.

Map matching can match recorded geographic coordinates to a logical model of the real world, (e.g. using a Geographic Information System (GPS), etc.). In one example, a map matching algorithm can obtain a recorded, serial location points (e.g. from GPS) and relate them to edges in an existing street graph (e.g. as a network). This can be in a sorted list representing the travel of an autonomous vehicle.

Object detection can use computer vision and/or image processing detect instances of semantic objects of a certain class (e.g. humans, buildings, other vehicles, etc.) in digital images and videos. Examples of object detection include vehicle detection and pedestrian detection.

Object tracking can be the process of locating a moving object (or multiple objects) over time using sensors such as radar, camera, lidar, etc. to obtain an environment measurement device. In same examples, an object tracker can use object recognition techniques for object tracking.

Path can be a road, highway, rail system, runway, boat route, bike path, etc., according to various embodiments.

Radar is an object-detection system that uses radio waves to determine the velocity of objects.

Rationality check can include tests to evaluate whether a sensor data value and/or the result of a calculation can possibly be true.

Reinforcement learning (RL) is an area of machine learning inspired by behaviorist psychology, concerned with how software agents ought to take actions in an environment so as to maximize some notion of cumulative reward.

Vehicle-to-everything (V2X) communication is the passing of information from a vehicle to any entity that may affect the vehicle, and vice versa. It is a vehicular communication system that incorporates other more specific types of communications V2I (Vehicle-to-Infrastructure), V2V (Vehicle-to-vehicle) V2P (Vehicle-to-Pedestrian), V2D (Vehicle-to-device) and V2G (Vehicle-to-grid).

Vehicle can be a mobile machine (e.g. transports people or cargo). Typical vehicles can include wagons, bicycles, motor vehicles (e.g. motorcycles, cars, trucks, buses), railed vehicles (e.g. trains, trams), watercraft (e.g. ships, boats), aircraft, spacecraft and/or heavy equipment (e.g. dump trucks, tractors, etc.).

Visual odometry is the process of determining the position and orientation of a robot by analyzing the associated camera images.

Exemplary Systems

A reinforcement learning (RL) model ear by maximizing cumulative rewards function that are designed to learn a specific decision process, here for autonomous vehicle application, ex: when to change lane. Safe action is not guaranteed by maximizing rewards function in real application. A Safety Sanity Index (SSI) is provided. The SSI is designed and monitored by a vehicle safety manager to monitor the safety performance of RL model. The observed state and reward are feedback to an agent to decide the next action. The observed state is also feedback to a new module, called, Epistemic Uncertainty Check (EUC) to access if the input state varies significantly from training state distribution. The training-state distribution can be derived from the set of data used to train the RL model. The training set distribution an be perceived to be multivariate distribution. A Principal Component analysis can be used on input data set. EUC output a RL model Confidence Factor (RLMCF). A new module, called, Action Integrity Module (AIM) takes RLMCF, action from the agent and any interruptible command from VSM to send the final action to environment. This framework provides robust and safe handling of RL model decision n real autonomous vehicle application.

In one example, the Epistemic Uncertainty Check can be implemented in input data during inferencing. This can be used to confirm that the underlying data is sufficiently similar to the training dataset. The Epistemic Uncertainty Check can then flag the input data as belonging to the training-data set distribution or as outside the training-data set. The Epistemic Uncertainty Check can use a specified point of inference or a point estimate prediction (e.g. by utilizing a prediction uncertainty estimate to check accuracy).

FIG. 1 depicts an example autonomous vehicle management system, according to some embodiments. Autonomous vehicle management system can include a fully autonomous vehicle software stack 100. Fully autonomous vehicle software stack 100 can receive sensor data from sensors 110. Additional information about sensors 110 is provided infra in the description of FIG. 3. It is noted that queries and/or commands can be provided from fully autonomous vehicle software stack 100 to sensors 110.

Fully autonomous vehicle software stack 100 can implement control and planning algorithms of an autonomous vehicle. Fully autonomous vehicle software stack 100 can manage the generation and modification of an internal map. Fully autonomous vehicle software stack 100 can determine vehicle localization (e.g. determining a location of a vehicle in a map). Fully autonomous vehicle software stack 100 can manage vehicle perception (e.g. determining information about objects around the vehicle). Fully autonomous vehicle software stack 100 can provide instructions/controls for vehicle systems 112 (e.g. see FIG. 4 infra). Vehicle systems 112 can include a collection of components, linkages, etc. which allows a vehicle to follow the desired course.

Fully autonomous vehicle software stack 100 can include a vehicle safety manager 102, application 104, middleware 106, operating system 108. Fully autonomous vehicle software stack 100 can include a remote interface manager 114.

Figure 2:
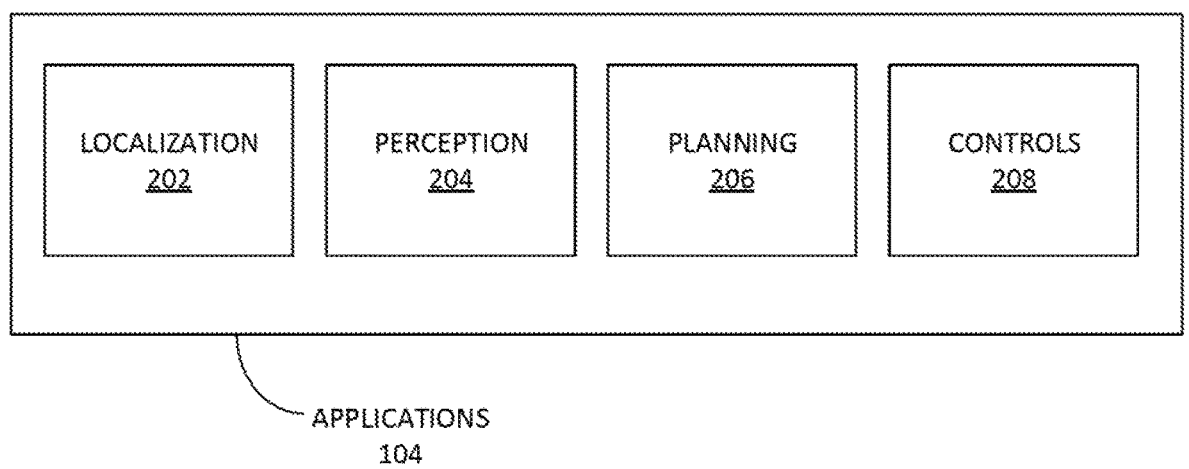
FIG. 2 illustrates an example of set of modules in applications of a fully autonomous vehicle's software stack, according to some embodiments.

FIG. 2 illustrates an example of set of modules in applications 104 of Fully autonomous vehicle software stack 100, according to some embodiments. Applications 104 can include, inter alia, localization module 202, perception module 204, planning module 206, and/or controls module 208. Localization module 202 can, inter alia, implement: map management, map matching, visual odometry, dead reckoning, location history management, etc. Localization module 202 can also implement a consistency module (e.g. see FIG. 5 infra). Consistency module can implement rationality checks, deficiency checks, normalize sensor data, etc.

Perception module 204 can implement, inter alia: object detection, object classification, object tracking, local world management, map information management, etc. For example, the perception module 204 can generate the consistent internal map based on sensor data from the sensors 210. Consistent internal map can be a localized map of sensed entities/objects around the autonomous vehicle. These sensed entities/objects can be mapped in three dimensions (3D).

Planning module 206 can implement, inter alia: behavior planning, global planning, path planning, fail-safe path, path history, etc. It is noted that various machine-learning algorithms (e.g. reinforcement learning algorithms) can be utilized to make predictions about the behavior of entities in the consistent internal map. Planning module 206 can project these predictions onto the consistent internal map. Based on these predictions, planning module 206 can direct sensors 210 to obtain specific types of information or behave in specified manners to provide additional sensor data to update the consistent internal map. For example, planning module 206 can command the Lidar sensor to narrow its range of sensing from a three hundred and sixty-degree (360°) view to a narrower range that includes a specific object to be sensed and/or tracked in greater detail by the Lidar system. In this way, the consistent internal map is updated based on feedback from planning module 206.

Control module 208 can implement, inter alia: vehicle state estimates, dynamic bound, motion control, fail-safe control action, CAN communication, etc.

It is noted that applications 104 can also render feedback to a user 'driver'/passenger (e.g. via a user interface in the autonomous vehicle such as a touch screen, speaker system, etc.). The feedback can include information as to current and/or future actions by the autonomous vehicle. The feedback can also include reasons for said current and/or future actions.

Figure 3:
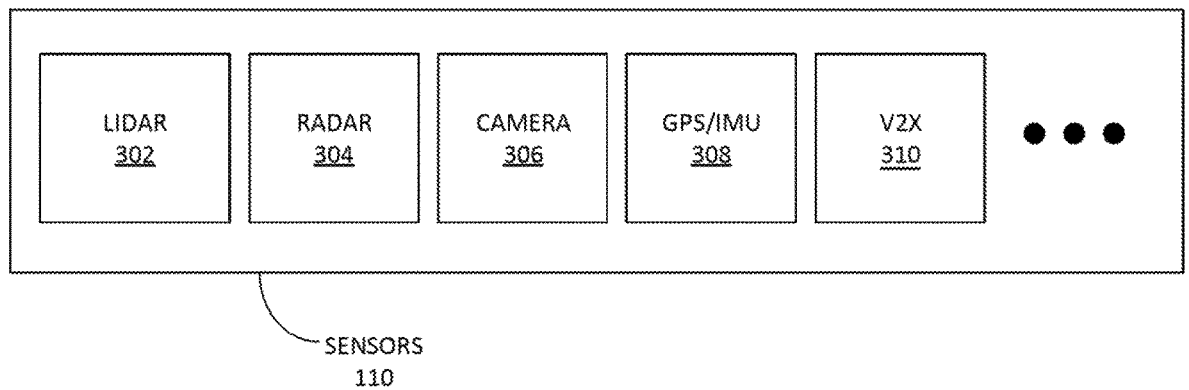
FIG. 3 illustrates an example set of sensors of an autonomous vehicle, according to some embodiments.

FIG. 3 illustrates an example set of sensors 110 of an autonomous vehicle, according to some embodiments. Sensors 110 an obtain environmental information for an autonomous vehicle. This sensor data can then be fed to a consistency module (as noted supra). Consistency module can then provide the normalized sensor data to localization module 202. Localization module 202 can then utilize the normalized sensor data to generate and/or update the consistent internal map of the real-time (e.g. assuming networking and processing latencies et.) environment of the autonomous vehicle. It is noted that the consistent interval map can be maintained in the event that a sensor falls offline. Sensors 110 can include, inter alia: lidar, radar, digital cameras, GPS/IMU, v2x, etc.

Figure 4:
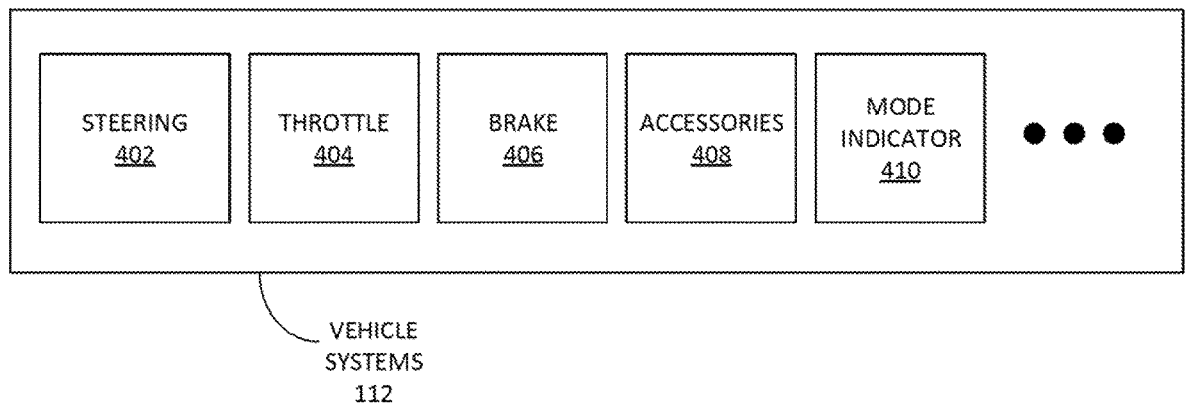
FIG. 4 illustrates an example set of vehicle according to some embodiments.

FIG. 4 illustrates an example set of vehicle systems 112, according to some embodiments. Vehicle systems 112 can be used to set the path and speed of the vehicle. Controls module 208 can provide input into vehicle system 112. In this way, the controls module 208 can manage the speed, direction, turning, braking, acceleration, etc. of the autonomous vehicle. Vehicle system 112 carp also provide current vehicle mode information. Example vehicle system 112 can include, inter alia: steering, throttle, brake, accessories, mode indicator, etc.

Example Processes

Figure 5:
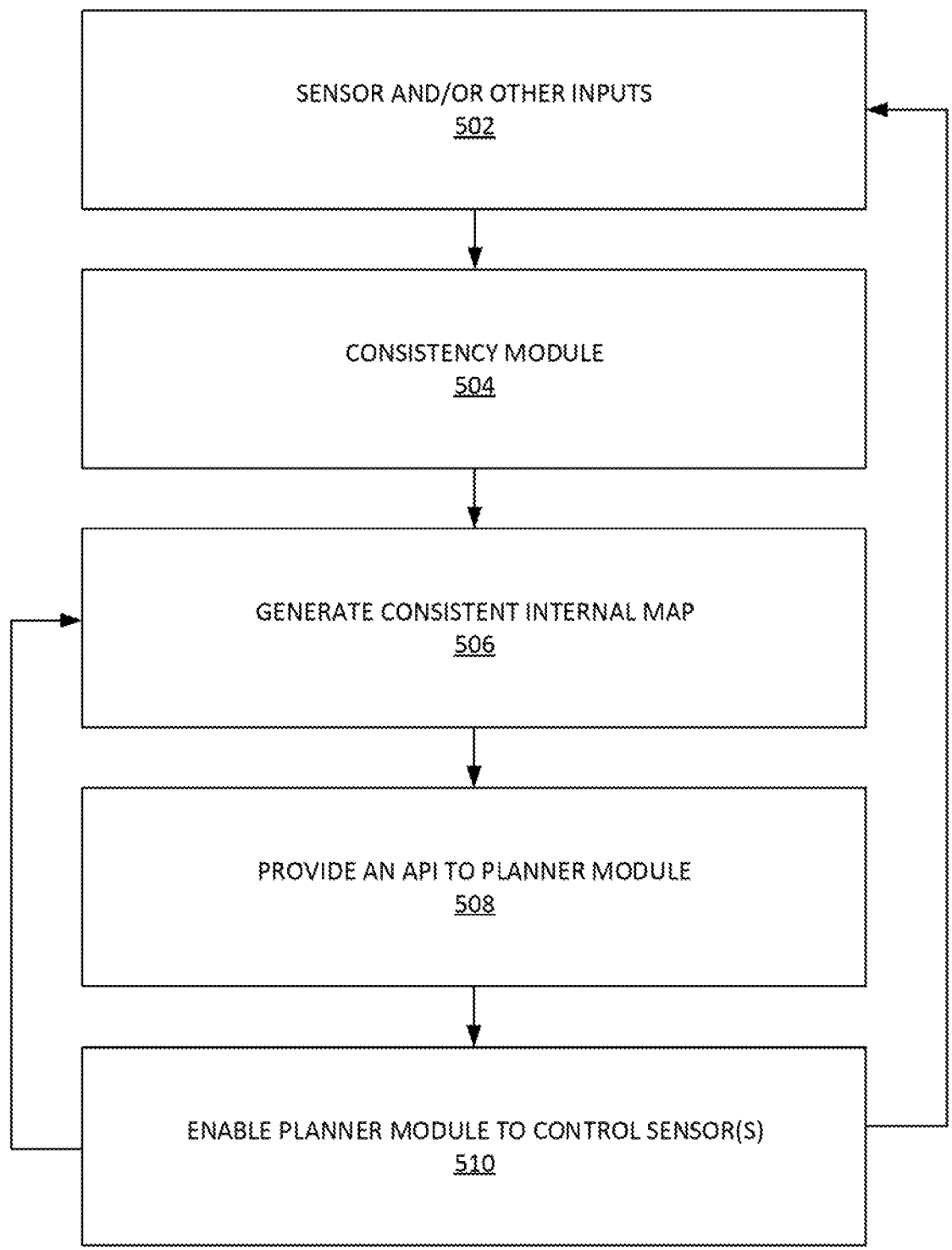
FIG. 5 illustrates an example process for generating and maintaining a consistent internal map of an autonomous vehicle's environment, according to some embodiments.

FIG. 5 illustrates an example process 500 for generating and maintaining a consistent internal map of an autonomous vehicle's environment, according to some embodiments. In step 502, sensor and/or other inputs an be received. In step 504, consistency module can implement rationality checks, deficiency checks normalize sensor data, etc. In step 506, process 500 can generate consistent internal map. It is noted that step 506 can also be used to update the consistent internal map based on the consistent internal map can be a 3D map of the autonomous vehicles environment. In step 508, process 500 provide an application programming interface (API) to a planner module (e.g. planning module 206). In this way, the planner module can communicate with a module that generates the consistent internal map (e.g. localization module 202). In step 510, process 500 can enable planner module to control sensor(s).

Figure 6:
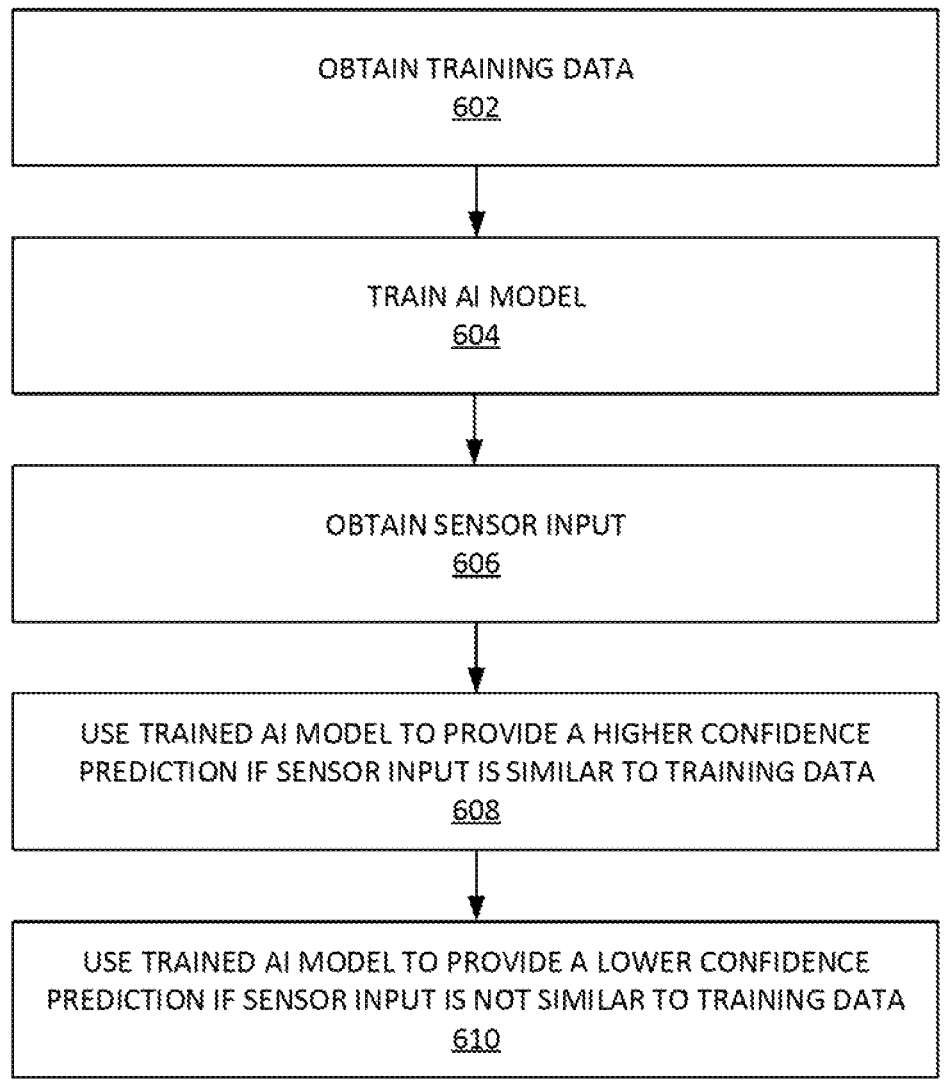
FIG. 6 illustrates an example process of placing confidence weights on real-time sensor input used to make predictions regarding an autonomous vehicle's locally mapped objects, according to some embodiments.

FIG. 6 illustrates an example process of placing confidence weights on real-time sensor input used to make predictions regarding an autonomous vehicle's locally mapped objects, according to some embodiments. In step 602, process 600 can obtain training data. The training data can be labelled test data. The distributions of the data can also be obtained and stored for later use. In step 604, process 600 can train the AI model based on the input training data obtained in step 602. For example, process 600 can use deep reinforcement learning to train the AI model. Step 602 and 604 can be a training, subset of process 600 and need not be performed for each iteration of the later steps of process 600. In step 606, process 600 can obtain real-time sensor input from sensor of an autonomous vehicle. Process 600 can compare the distribution of the incoming sensor data with the distribution of the training sensor data. Accordingly, in step 608, process 600 can use the trained AI model to provide a higher confidence prediction if sensor input is similar to training data. In step 610, process 600 can use the trained AI model to provide a lower confidence prediction if sensor input is not similar to training data.

In one example, process 600 can be used to determine if the current digital camera data sufficient or the AI model to predict that on object is a pedestrian for example. The training data can be millions of images using an RGB values as the distribution. Based on the comparison of the RGB value distribution of the training set with the RGB value distribution of the present digital camera data, process 600 can determine a confidence score of the AI model to accurately predict that the output is a pedestrian. The confide ore of the model is used by the next block in the algorithm, say planning, to decide if the prediction of the AI model shall be used in the decision process.

Figure 7:
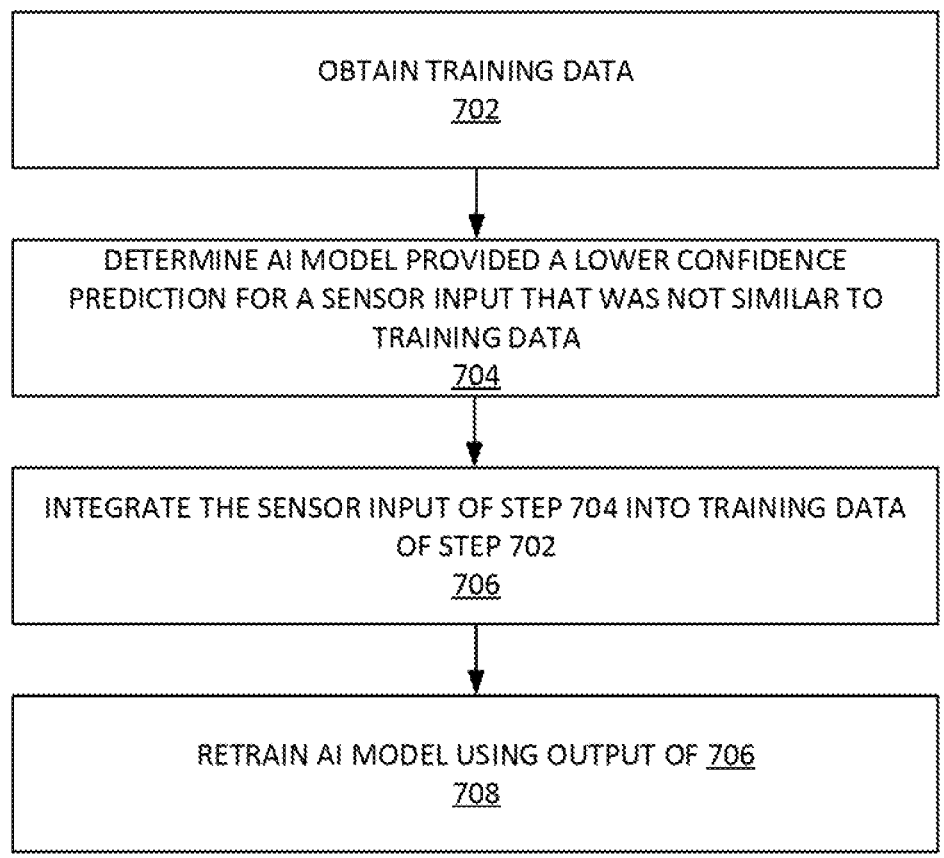
FIG. 7 illustrates an example process for updating an AI model, according to some embodiments.

FIG. 7 illustrates an example process 700 for updating an AI model, according to some embodiments. Process 700 can be implemented when a real-life implementation of process 600 provides a lower confidence prediction if sensor input is not similar to training data. In step 702, process 700 can obtain training data. In step 704, process 700 can determine that the AI model provided a lower confidence prediction for a sensor put that was not similar to the training data. In step 706, process 700 can integrate the sensor input of step 704 into training data of step 702. In step 708, process 700 can retrain AI model using output of 706.

Continuing with the above digital camera input ex pie in FIG. 6. Process 600 may have assigned the real-time digital camera input with a low confidence score. Accordingly, this digital camera data can be integrated into the training data set and a new AI model generated. Accordingly, in the future when the real-time digital camera input is encountered, the AI model generate a predication with a higher confidence score. In this way, the AI model can be improved based on encountered needs.

Exemplary Environment and Architecture

Figure 8:
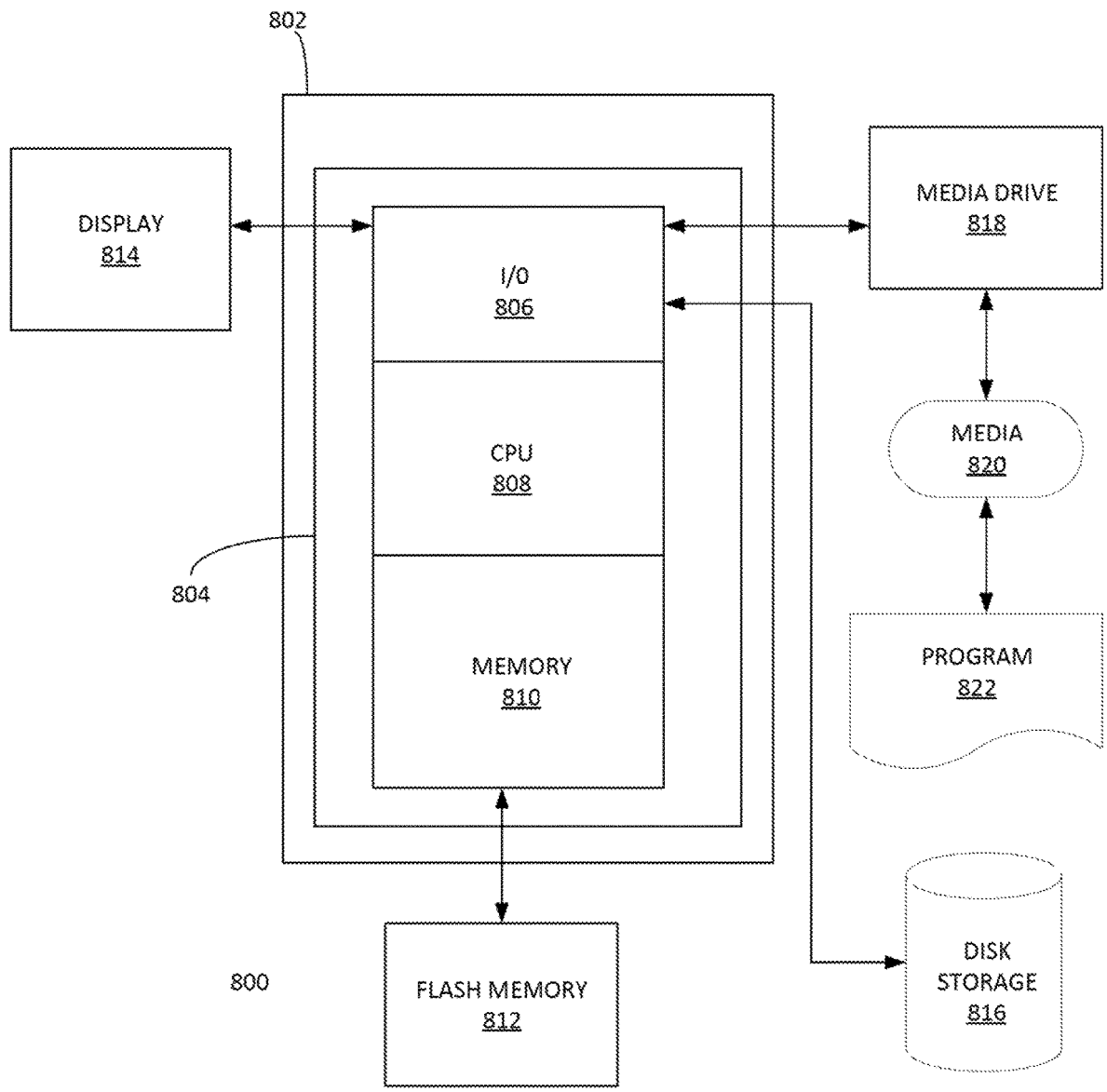
FIG. 8 depicts an exemplary computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or other user input (not shown), a disk storage unit 816, and a media drive unit 818. The media drive unit 818 can read/write a computer-readable medium 820, which can contain programs 822 and/or data. Computing system 800 can include a web browser. Moreover, it is noted that computing system 800 can be configured to include additional systems in order to fulfill various functionalities. Computing system 800 can communicate with other computing devices based on various computer communication protocols such Bluetooth (and/or other standards for exchanging data over short distances includes those using short-wavelength radio transmissions), USB, Ethernet, cellular, an ultrasonic local area communication protocol, etc.

Additional Methods

Figure 9:
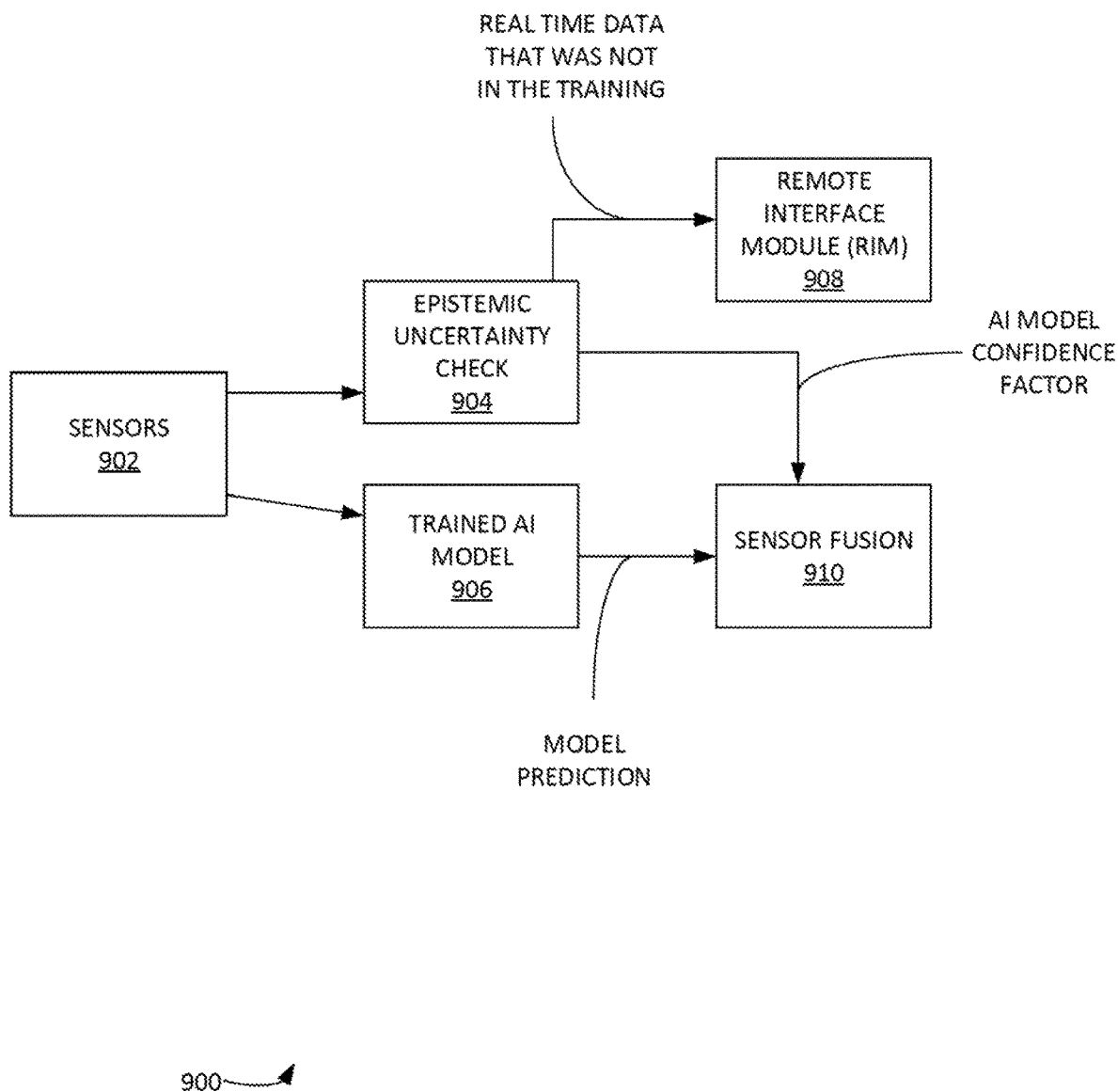
FIGS. 9 and 10 illustrate additional processes of using reinforcement learning (RL) methods in an autonomous vehicle, according to some embodiments.
Figure 10:
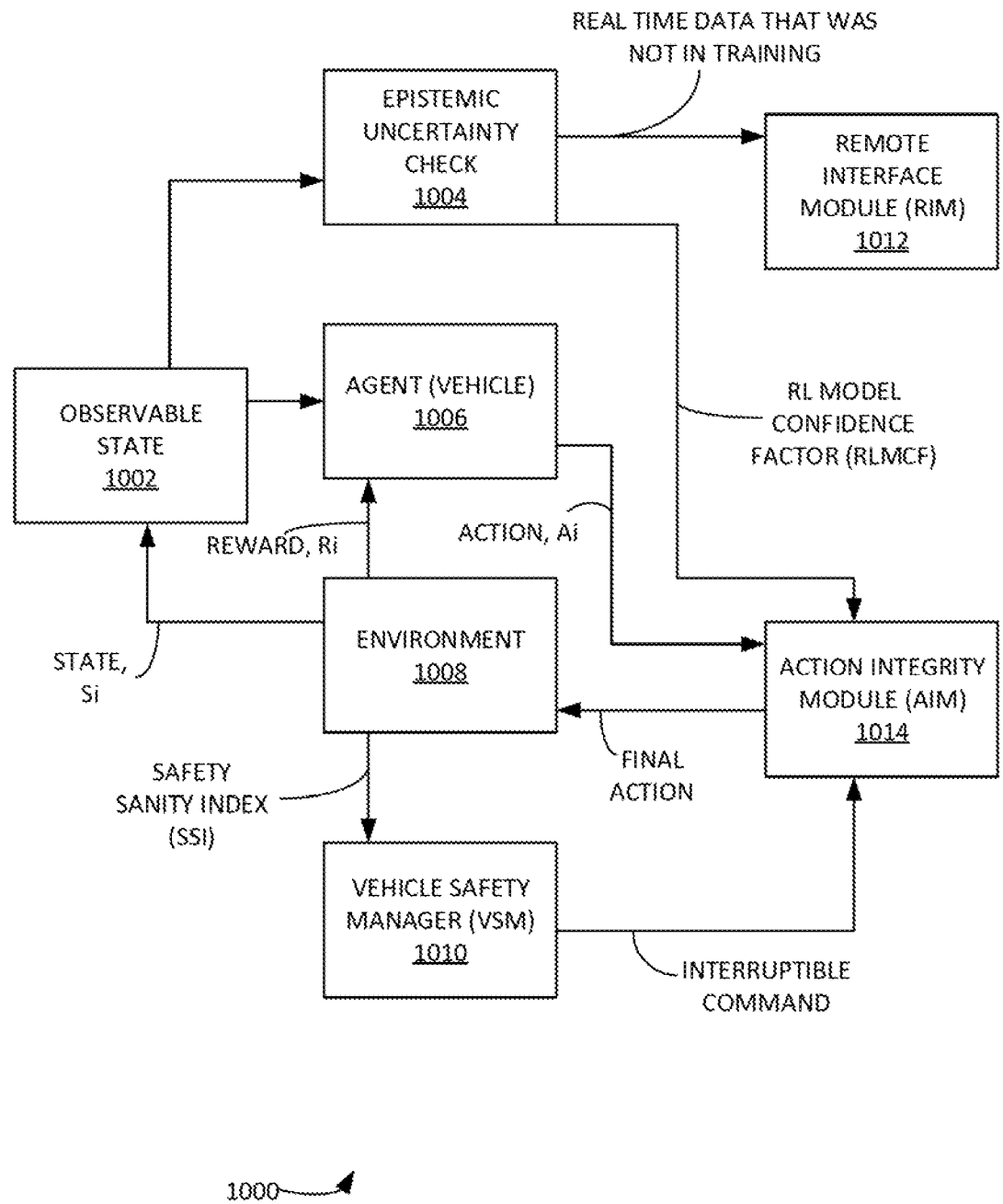

FIGS. 9 and 10 illustrate additional processes of using reinforcement learning (RL) methods in an autonomous vehicle, according to some embodiments. A reinforcement learning (RL) model can learn by a maximizing rewards function. The rewards function can be designed to specifically learn specific decision process, such as an autonomous vehicle application (e.g. when to change lanes, etc.). Safe action is not guaranteed by maximizing rewards function in real application. A Safety Sanity Index (SSI) can be designed and monitored by Vehicle Safety Manager to monitor the safety performance of RL model. The observed state is then provided as feedback to an agent to decide the next action along with reward function. The reward function is generated by a mathematical function. The reward function captures the immediate indication if the action is good for final goal or not. The agent receives a positive reward if the action moves the agent towards goal and negative if it takes it away from the goal. The observed state is also feedback to a new module, called, Epistemic Uncertainty Check (EUC) to access if the input state distribution varies significantly from training state distribution. EUC output an RL model Confidence Factor (RLMCF). RLMCM is an indication on how well the RL model can predict an action given the current state. An Action Integrity Module (AIM) receives the RLMCF from EUC, any interruptible command from VSM, and suggested final action from RL agent. AMI decides if RL action is okay to send it to environment and if not then sends an overriding final action to the environment. This framework provides robust and safe handling of RL model decision in real autonomous vehicle application. Process 900 and/or 1000 can use deep reinforcement learning (DRL) as well. In a driving scenario, the observed state can be the set of states/actions of all the actors around the vehicle are doing currently. The observed state can include a snapshot of a perception view and a vehicle current state. It can include a snapshot of what all actors around the vehicle are doing currently performing as well. In one example, the observed state can be that the vehicle has moved ahead on the road five (5) feet along with its current speed, position, acceleration, lane position, nearby objects and their respective motions, etc.

In step 902, process 900 carp obtain sensor data. The sensor data can be communicated to an EUC module 904 and a trained AI model 906. From the EUC module 904 process 900 can communicate real time data that was not in the training to remote interface module 908. An AI model confidence factor can be communicated to a sensor fusion module 910 from EUC module 904. A model prediction can be communicated to a sensor fusion module 910 from AI model 906.

In step 1002, process 1000 can have a current observable state 1002 of a fully autonomous vehicle. In this process, a RL model confidence factor (RLMCF) can be communicated by EUC module 904 to action integrity module (AIM) 1014. AIM 1014 can communicate an action to Environment 1008. AIM 1014 can receive an interruptible command from vehicle safety manager (VSM) 1010. VSM 1010 can receive a Safety Sanity Index (SSI) from Environment 1008 to generate the interruptible command. Observable state 1002 can be sent to agent 1006. Environment 1008 can send a reward value to the agent 1006. Environment 1008 can send a state value to update observable state 1002. In one example, observable state 1002 can include inter alia: a sample set, of observable: an image from camera in vectorized form the vehicle speed, position, and heading offline map data in vectorized form.

In some examples, an internal map can be created. The internal map can serve various purpose, such as: API to planning module, current state information to UI/UX, etc. A snippet of information from internal map at each time interval (ex: 500 ms) that captures the environment at that time, to cloud via Remote Interface Module (RIM). Each packet of metadata from internal map can be stored, aggregated, and/or analyzed offline a cloud-computing based application for answering specific query about the environment where the autonomous vehicle traveled and captured the information. For example, in a mining truck application, the metadata can be used to answer question regarding, how the mine surface and topology has changed over a specified period (e.g. last 24 hours, last week, etc.).

CONCLUSION

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (PHP, JavaScript, XML). It is noted that Java Script has been used as an example in several embodiments. However, in other embodiments, another scripting language and/or JavaScript variants can be utilized as well.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it, will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computer-implemented method performed by an autonomous vehicle, the method comprising:
   executing a reinforcement learning (RL) model-agent, the RL model-agent having been trained using a reinforcement learning method and a training dataset, wherein the RL model-agent is configured to determine one or more actions to be performed by the autonomous vehicle by maximizing a reward function related to a specified operation of the autonomous vehicle;
   obtaining an observed state for the autonomous vehicle, wherein the observed state is based on captured sensor data, and wherein the observed state represents a current state of the autonomous vehicle and of one or more objects around the autonomous vehicle;
   determining, by the RL model-agent and based on the observed state, a first action to be performed by the autonomous vehicle;
   generating, by an Epistemic Uncertainty Check (EUC) module, an RL Model Confidence Factor (RLMCF) indicative of how well the RL model-agent can predict an action to be performed by the autonomous vehicle given the observed state, wherein generating the RLMCF comprises comparing a distribution of data in the observed state to a distribution of data in the training dataset;
   communicating the RLMCF and the first action to an Action Integrity Module (AIM); and
   determining, by the AIM and based on the RLMCF, a final action to be performed by the autonomous vehicle, wherein the final action is the first action or a different action that the AIM decides the autonomous vehicle should perform instead of the first action.

2. The computer-implemented method of claim 1, further comprising:
   determining a value of the reward function based on the first action;
   passing the value of the reward function to the RL model-agent; and
   determining, by the RL model-agent, a second action based on the value of the reward function, the second action to be performed by the autonomous vehicle after the final action.

3. The computer-implemented method of claim 2, wherein the value of the reward function indicates how close the autonomous vehicle is to achieving a goal, wherein the value of the reward function is high when the first action brings the autonomous vehicle closer to achieving the goal and low or negative when the first action brings the autonomous vehicle farther from achieving the goal.

4. The computer-implemented method of claim 1, wherein the RL model-agent comprises an artificial intelligence based software agent implemented in a computing system in the autonomous vehicle.

5. The computer-implemented method of claim 1, wherein generating the RLMCF further comprises performing the following by the EUC module:
   calculating a distance value indicating how much the distribution of data in the observed state varies from the distribution of data in the training dataset; and
   determining that the distribution of data in the observed state varies from the distribution of data in the training dataset based on the distance value.

6. The computer-implemented method of claim 5, wherein the distance value is a Mahalanobis distance.

7. The computer-implemented method of claim 1, wherein the observed state comprises a current speed of the autonomous vehicle, a position of the autonomous vehicle, an acceleration of the autonomous vehicle, and a lane position of the autonomous vehicle.

8. The computer-implemented method of claim 1, wherein comparing the distribution of data in the observed state to the distribution of data in the training dataset comprises:
   comparing the sensor data on which the observed state is based to sensor data represented in the training dataset.

9. The computer-implemented method of claim 1, further comprising:
   generating a Safety Sanity Index (SSI) that is indicative of a safety performance of the RL model-agent;

generating an interruptible command based on the SSI and the observed state; and communicating the interruptible command to the AIM, wherein determining the final action further comprises determining, based on the interruptible command, whether to override the first action with the different action.

10. A computer system comprising:

at least one processor; and a memory containing instructions that, when executed by the at least one processor, cause the at least one processor to perform operations comprising:

executing a reinforcement learning (RL) model-agent, the RL model-agent having been trained using a reinforcement learning method and a training dataset, wherein the RL model-agent is configured to determine one or more actions to be performed by an autonomous vehicle by maximizing a reward function related to a specified operation of the autonomous vehicle;

obtaining an observed state for the autonomous vehicle, wherein the observed state is based on captured sensor data, and wherein the observed state represents a current state of the autonomous vehicle and of one or more objects around the autonomous vehicle;

determining, by the RL model-agent and based on the observed state, a first action to be performed by the autonomous vehicle;

generating, by an Epistemic Uncertainty Check (EUC) module, an RL Model Confidence Factor (RLMCF) indicative of how well the RL model-agent can predict an action to be performed by the autonomous vehicle given the observed state, wherein generating the RLMCF comprises comparing a distribution of data in the observed state to a distribution of data in the training dataset;

communicating the RLMCF and the first action to an Action Integrity Module (AIM); and determining, by the AIM and based on the RLMCF, a final action to be performed by the autonomous vehicle, wherein the final action is the first action or a different action that the AIM decides the autonomous vehicle should perform instead of the first action.

11. The computer system of claim 10, wherein the operations further comprise:

determining a value of the reward function based on the first action;

passing the value of the reward function to the RL model-agent; and determining, by the RL model-agent, a second action based on the value of the reward function, the second action to be performed by the autonomous vehicle after the final action.

12. The computer system of claim 10, wherein the generating of the RLMCF further comprises:

calculating a distance value indicating how much the distribution of data in the observed state varies from the distribution of data in the training dataset; and determining that the distribution of data in the observed state varies from the distribution of data in the training dataset based on the distance value.

13. The computer system of claim 12, wherein the distance value is a Mahalanobis distance.

14. The computer system of claim 10, wherein comparing the distribution of data in the observed state to the distribution of data in the training dataset comprises:

comparing the sensor data on which the observed state is based to sensor data represented in the training dataset.

15. The computer system of claim 10, wherein the operations further comprise:

generating a Safety Sanity Index (SSI) that is indicative of a safety performance of the RL model-agent;

generating an interruptible command based on the SSI and the observed state; and communicating the interruptible command to the AIM, wherein determining the final action further comprises determining, based on the interruptible command, whether to override the first action with the different action.

16. A non-transitory computer-readable medium storing instructions that, when executed by at least one processor of a computer system, cause the at least one processor to perform operations comprising:

executing a reinforcement learning (RL) model-agent, the RL model-agent having been trained using a reinforcement learning method and a training dataset, wherein the RL model-agent is configured to determine one or more actions to be performed by an autonomous vehicle by maximizing a reward function related to a specified operation of the autonomous vehicle;

obtaining an observed state for the autonomous vehicle, wherein the observed state is based on captured sensor data, and wherein the observed state represents a current state of the autonomous vehicle and of one or more objects around the autonomous vehicle;

determining, by the RL model-agent and based on the observed state, a first action to be performed by the autonomous vehicle;

generating, by an Epistemic Uncertainty Check (EUC) module, an RL Model Confidence Factor (RLMCF) indicative of how well the RL model-agent can predict an action to be performed by the autonomous vehicle given the observed state, wherein generating the RLMCF comprises comparing a distribution of data in the observed state to a distribution of data in the training dataset;

communicating the RLMCF and the first action to an Action Integrity Module (AIM); and determining, by the AIM and based on the RLMCF, a final action to be performed by the autonomous vehicle, wherein the final action is the first action or a different action that the AIM decides the autonomous vehicle should perform instead of the first action.

17. The non-transitory computer-readable medium of claim 16, wherein the operations further comprise:

generating the reward function based on the first action;

passing the reward function to the RL model-agent; and determining, by the RL model-agent, a second action based on the reward function, the second action to be performed by the autonomous vehicle after the final action.

18. The non-transitory computer-readable medium of claim 16, wherein the generating of the RLMCF further comprises:

calculating a distance value indicating how much the distribution of data in the observed state varies from the distribution of data in the training dataset; and determining that the distribution of data in the observed state varies from the distribution of data in the training dataset based on the distance value.

19. The non-transitory computer-readable medium of claim 18, wherein the distance value is a Mahalanobis distance.

20. The non-transitory computer-readable medium of claim, 16 wherein the operations further comprise:
   generating a Safety Sanity Index (SSI) that is indicative of a safety performance of the RL model-agent;
   generating an interruptible command based on the SSI and the observed state; and
   communicating the interruptible command to the AIM, wherein determining the final action further comprises determining, based on the interruptible command, whether to override the first action with the different action.

* * * * *